United States Patent [19]

Bishop

[11] 3,872,017

[45] Mar. 18, 1975

[54] SKIMMING BLADE

[75] Inventor: Wayne C. Bishop, Doylestown, Pa.

[73] Assignee: FMC Corporation, Chicago, Ill.

[22] Filed: Oct. 18, 1972

[21] Appl. No.: 298,506

[52] U.S. Cl. .................................. 210/525, 210/527
[51] Int. Cl. ............................................ B01d 21/00
[58] Field of Search ........... 210/527, 529, 530, 531, 210/523, 525

[56] References Cited
UNITED STATES PATENTS

| 2,160,838 | 6/1939 | Dorr | 210/527 |
| 3,498,467 | 3/1970 | Hollebrandt | 210/527 |
| 3,756,418 | 9/1973 | Pontz et al. | 210/525 |
| 3,797,664 | 3/1974 | Pentz et al. | 210/527 |

Primary Examiner—Theodore A. Granger
Attorney, Agent, or Firm—Dressler, Goldsmith, Clement & Gordon, Ltd.

[57] ABSTRACT

This invention relates to a skimming blade for use in a liquid clarification tank which has a plurality of longitudinally extending weir boxes that define the outlet for receiving clarifying liquid. The skimming blade is supported on a bridge that is reciprocated above the tank along a path parallel to the direction of flow of liquid within the tank and has cutouts extending from the lower edge with the cutouts having bases located above the lower edge of the blade. The skimming blade is maintained in a first skimming position where the bases of the cutouts are above the liquid level while the bridge is traversing the box area of the tank and a second skimming position where the bases of the cutouts and the lower edge of the blade are located below the liquid level.

11 Claims, 3 Drawing Figures

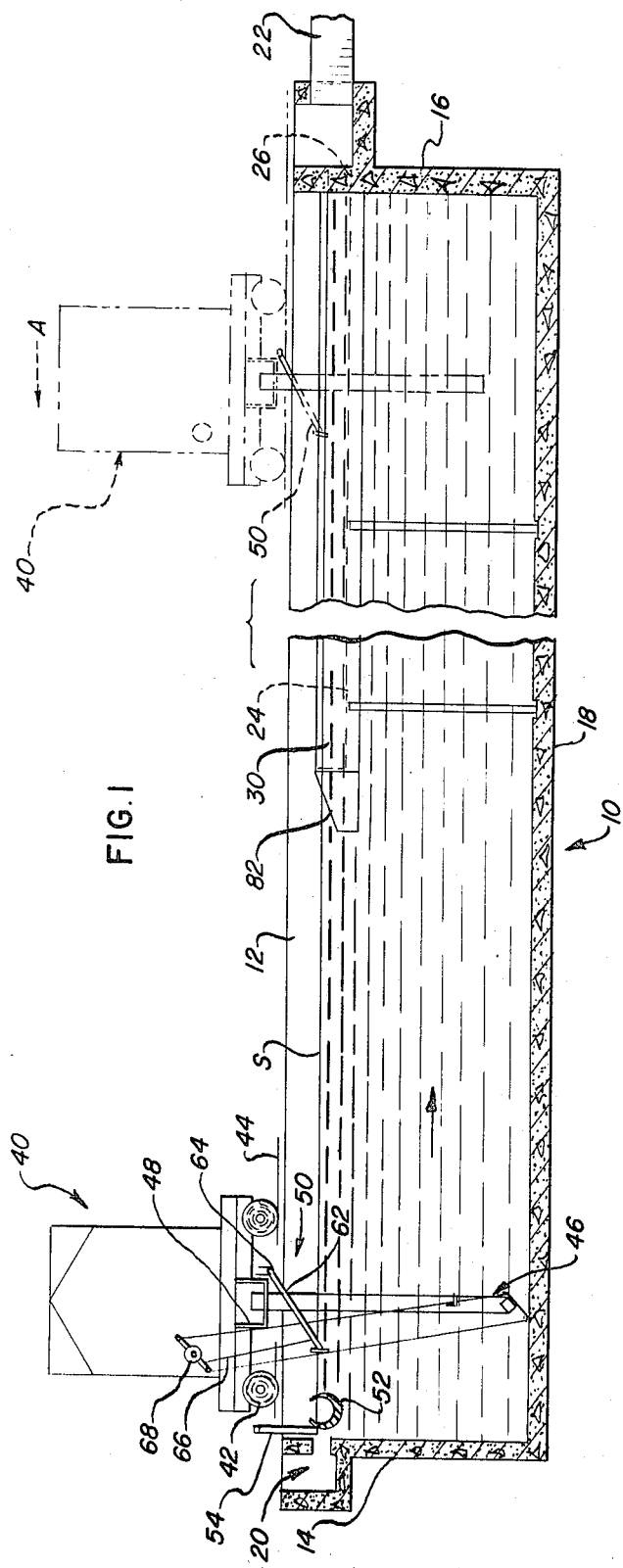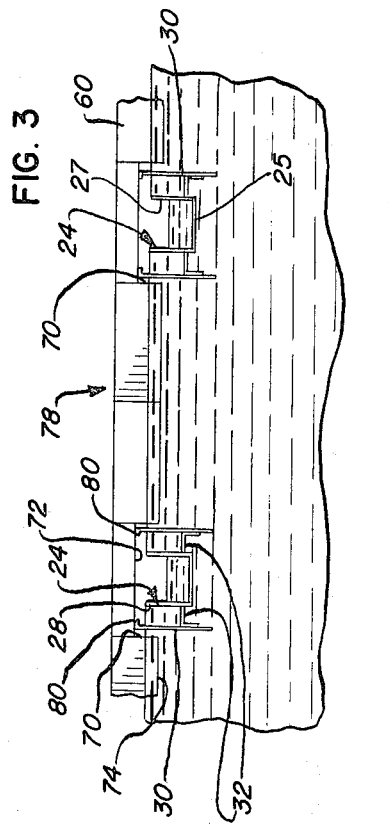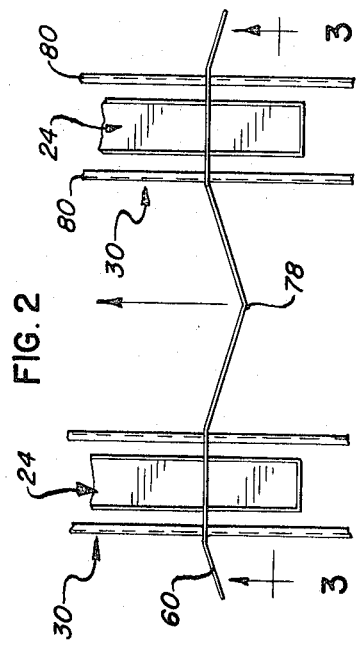

SKIMMING BLADE

BACKGROUND OF THE INVENTION

In sewage treatment, one of the steps in the processing of the sewage involves settling of solids from the liquid and removing all of the solids before the clarified liquid is returned to the water supply. Usually this is accomplished by gravity separation tanks wherein the liquid having solids entrained therein is fed into one end of the tank and slowly flows towards the opposite end of the tank while the solids are separated therefrom. Most of the time, the liquid that is fed to such tanks includes solids and other materials, known as scum, that have a specific gravity less than that of the liquid and thereby float to the surface of the liquid. To remove the scum, it is customary to incorporate some type of skimming apparatus that skims the surface of the liquid while the settled solids are removed from the bottom of the tank.

In recent years, the use of rectangular gravity separation tanks has become increasingly popular. Rectangular tanks substantially simplify the construction of various portions of the sewage plant because in many instances a common wall may be employed between two different tanks. Furthermore, the rectangular tanks require substantially less space than do circular tanks, which have been standard in the industry for many years.

Because the capacity of most sewage treatment plants is extremely high, very large rectangular final settling tanks are needed to accommodate the flow of all of the liquid while the solids are being separated therefrom.

In the use of large settling tanks, one type of outlet which has become increasingly popular is the use of a plurality of longitudinally extending weir boxes which are transversely spaced from each other and extend from the outlet end of the tank towards the inlet end.

In arrangements of this type, one of the problems that has been encountered is the removal of scum or other floating matter that reaches the surface of the liquid in the area of the weir system.

SUMMARY OF THE INVENTION

The present invention contemplates a skimming means for use in a polygonal settling tank which has a bridge reciprocal along a path parallel to a plurality of longitudinally extending transversely spaced weir boxes that are located adjacent the outlet end of the settling tank. The skimming means is designed to remove all of the scum and floating matter from the entire tank, including the area where the weir boxes are located.

In the preferred embodiment of the invention, the skimming blade includes a plurality of rectangular spaced cutouts or recesses that extend from the lower edge of the blade. The cutouts are transversely spaced on the blade and are longitudinally aligned with the respective weir boxes while the cutouts have bases that extend generally parallel to the lower edge of the blade. The cutouts accommodate movement of the blade along the area of the tank having the weir boxes located therein while the lower edge of the blade remains below the liquid level.

The blade is supported on the bridge so as to be in a first skimming position while traversing the weir box area of the tank and in this position, the bases of the cutouts are located above the liquid level while the lower edge of the blade is located below the liquid level. The skimming blade also has a second position while traveling in one direction in the area of the tank adjacent the inlet. In the second skimming position, the bases of the cutouts are located below the level of the liquid, while the lower edge of the blade remains below the surface of the liquid.

In the specific embodiment illustrated, the blade is automatically moved between the first and second skimming positions by cam means which are defined on the baffles that normally surround the weir boxes. The baffles have inclined surfaces on the end within the tank while the upper edges of the baffles have inwardly directed horizontal flanges which define a surface on which the bases of the cutouts are moved while the blade is moving in the area of the weir boxes.

According to another aspect of the invention, the area of the blade between adjacent cutouts is substantially V-shaped with the apex of the V located on the trailing side of the blade while the blade is in either skimming position and the bridge is being moved from the outlet towards the inlet. The V-shaped configuration of the blade allows the material to be collected in the apexes of the Vs while the bridge is traveling in the weir box area of the tank to insure that all of the material floating on the surface of the liquid is moved to a collection trough to the inlet end of the tank.

BRIEF DESCRIPTION OF SEVERAL VIEWS OF DRAWINGS

FIG. 1 is a fragmentary horizontal section showing a tank having the present invention incorporated therein;

FIG. 2 is an enlarged fragmentary plan view of the skimming blade as it is traversing the area of the tank having the weir boxes located therein; and FIG. 3 is an enlarged fragmentary transverse section through the tank in the area of the weir boxes.

DETAILED DESCRIPTION

While this invention is susceptible of embodiment in many different forms, there is shown in the drawings and will herein be described in detail one embodiment, with the understanding that the present disclosure is to be considered as an exemplification of the principles of the invention and is not intended to limit the invention to the embodiment illustrated.

FIG. 1 of the drawings shows liquid clarification tank 10 that has side walls 12 (only one being shown), inlet end 14, outlet end 16 and bottom wall 18. The inlet end 14 has an inlet 20 for supplying mixed liquor, consisting of liquids having entrained or suspended solids therein, to the tank. The mixed liquor flows towards the outlet end 16, during which time the solids are either settled to the bottom or floor 18 of the tank or will float to the upper surface of the liquid in the tank.

The outlet end 16 has an outlet 22 that is connected to a plurality of transversely spaced longitudinally extending weir boxes 24 that communicate with outlet 22 through openings 26 in outlet end 16. The weir boxes have bottom walls 25 and side walls 27 (FIG. 3) with the upper edges 28 of side walls 27 defining the liquid level for the tank.

In order to prevent the floating matter from entering the weir boxes, baffles 30 surround the weir boxes and have upper and lower edges that are located above and below the level of the liquid and the lower edge is located above floor 18. The baffles are supported on weir boxes 24 through support brackets 32.

The solids that settle by gravity to the bottom 18 of tank 10 as well as the solids and matter floating on the surface S of the liquid are collected through a traveling bridge 40 that is supported on opposite sides 12 of the tank 10 through wheels 42 riding on rails 44. The traveling bridge is reciprocated between extreme positions at the inlet and outlet end of the tank through suitable drive means, such as a reversible motor (not shown). The traveling bridge has settled solids or sludge collecting means 46 depending therefrom for withdrawing the settled solids from the bottom of the tank and deliver the solids to a trough 48 supported on the bridge. Since the sludge collection means or eductor means 46 form no part of the present invention, a detailed description thereof does not appear to be necessary. However, one type of eductor means that can be used for collecting the settled solids is depicted in the drawings and is shown and described in U.S. Pat. No. 3,797,664, which is assigned to the assignee of the present invention.

The traveling bridge 40 also supports skimming means 50 for removing all of the scum and other floating matter that is on the surface of the liquid and delivering the material to a scum collection trough 52 located adjacent the inlet 20. Scum collection trough 52 is in the form of a tube having an upper open portion and supported on opposite ends on the sides of the tank for rotation about its axis. The scum trough 52 may readily be rotated to a scum receiving position through suitable manual or automatic means 54.

According to the present invention, skimming means 50 is designed to remove all of the floating matter from the surface S of the liquid in all of the areas of the tank, including the weir box area. For this purpose, skimming means 50 consists of an elongated blade 60 that extends between opposite side walls 12 of the tank or transversely of the direction of the flow of liquid in the tank. The blade 60 is supported on the bridge through a plurality of arms 62 (only one being shown in FIG. 1) that are rigidly connected at one end to the blade and are pivoted at their opposite ends on the pivot pin 64. The arms 62 and pins 64 define pivotal means for supporting the blade for pivotal movement between first and second extreme positions.

The blade 60 is moved between the extreme positions through suitable pivot means such as a cable 66 connected to a rotating shaft 68 that is periodically rotated between extreme positions by reversible drive means in a manner well known in the art.

As was indicated above, skimming blade 60 is designed to remove the scum from all areas of the surface of the liquid, between the inlet and outlet ends. This is accomplished by a blade having a plurality of spaced cutouts 70 (FIG. 3) which are substantially rectangular and have bases 72 that are spaced above lower edge 74 by a dimension which is greater than a vertical spacing between the upper edges of weir boxes 24 and the upper edges of baffles 30. The cutouts or recesses 70 are spaced along the blade to coincide with and are longitudinally aligned with the baffles and weir boxes. The cutouts will allow the lower edge of the blade to be located below the level of the liquid while the bridge is traveling in the weir box area of the tank.

According to another aspect of the invention, the area of the blade between adjacent cutouts 70 is configured to insure that all of the floating material collected by the blade in the weir box area of the tank is carried to the scum trough or tube 52. For this purpose, the leading surface of the blade between adjacent cutouts 70 is substantially V-shaped, as shown in FIG. 2, with the apex 78 of the V located on the trailing side of the blade when the bridge is moving in the scum collecting direction. The V-shaped surface will insure that the materials collected in the weir box area of the tank will be carried to the tube 52. The portions of the blade having the cutouts therein may be planar or inclined to suit the desired needs.

According to a further aspect of the invention, the blade is maintained in a first skimming or intermediate position between the extreme positions discussed above, while the skimming blade is in the area of the tank having the weir boxes located therein, by a simple structure that is inexpensive to manufacture and does not require any maintenance.

In the illustrated embodiment of the invention, the blade is maintained in the intermediate or first skimming position by cam means that are defined on the upper edges of the respective baffles. The cam means are most clearly shown in FIGS. 1 and 3 and consist of inwardly directed horizontal flanges 80 on the upper edges 28 of the baffles that define guide surfaces which are in direct contact with the bases of the respective cutouts and inclined portions 82 on the ends of the respective baffles that are located adjacent the inlet end of the tank.

Thus, when the bridge 40 is in the weir box area of the tank the skimming means 50 will be supported on the horizontal flanges 80 on the respective baffles and will be maintained in the dotted line position shown in the right-hand portion of FIG. 1 and the cables will be loose. In this position, as is most clearly shown in FIG. 3, the lower edge 74 of the blade 60 is located below the level of the liquid in the tank while the bases 72 are spaced above the liquid level.

With the bridge traveling in the direction of arrow A shown in FIG. 1, the skimming blade 60 will automatically move to the second skimming position or extreme position defined by cables 66 as the bridge leaves the weir box area of the tank by moving down the inclined portions 82. In the second skimming or lower extreme position, the bases 72 of the respective cutouts and the lower edge 74 of the blade are both located below the surface of the liquid so that the entire surface area of the liquid between opposite sides 12 of the tank is having the scum removed therefrom.

When the bridge reaches the position shown in solid line of FIG. 1, the trough 52 may be rotated clockwise to place the opening in alignment with the surface of the liquid and allow the scum or floating matter collected by the blade to be directed into the trough for removal by suitable means (not shown).

It will be appreciated that the above skimming means or blade provides a simple and inexpensive expedient for removing all of the floating material on the surface of the liquid in all areas of the tank.

While a specific embodiment of the invention has been described, numerous modifications come to mind without departing from the spirit of the invention. For example, the cables 66 have been illustrated as being free while the skimming blade is in the first skimming position. The cables could readily incorporate biasing means that would maintain the cables taut all of the time.

Also, the cam means need not be an integral part of the baffles. The cam means could be separate tracks with inclined ramps that could be connected to the baffles adjacent the upper edges and cooperate with the bases of the cutouts and be connected adjacent the lower edges of the baffles and cooperate with the lower edge of the blade. The separate tracks could also be connected to the sides of the tank and cooperate with opposite ends of the blade. Suitable wear plates could be interposed between the tracks and the blades.

What is claimed is:

1. In a liquid clarification apparatus including a tank having an inlet for supplying fluid with entrained solids and an outlet for receiving clarified liquid, said outlet including a plurality of transversely spaced longitudinally extending weir boxes, each having a bottom wall and side walls, said side walls having upper edges defining the liquid level for said tank; a traveling bridge above said tank; drive means for reciprocating said bridge between extreme positions parallel to said longitudinally extending weirs; and skimming means depending from said bridge for removing scum from the surface of said liquid, said skimming means including an elongated blade extending transversely of said tank, said blade having cutouts aligned with said weir boxes in the direction of travel of said bridge, and said cutouts having bases located above the lower edge of said blade and below the upper edge of said blade; and means maintaining said blade in a first skimming position while said bridge is moving in the area of said weir boxes, a second skimming position below said first skimming position while said blade is in the area of the tank between said inlet and said weir boxes and an inoperative position where said blade is located above said upper edges when said bridge is traveling in an opposite direction, said bases of said cutouts being located above said upper edges in said first skimming position and below said upper edges in said second skimming position while said lower edge of said blade is located below said upper edges in both skimming positions.

2. Liquid clarification apparatus as defined in claim 1, further including baffles surrounding said weir boxes with said baffles extending above and below said upper edges of said weir boxes, and in which said means maintaining said blade in said first skimming position includes surfaces on said baffles for engaging the bases of said cutouts to maintain said blade in said first skimming position when the blade is in the weir box area of the tank.

3. Liquid clarification apparatus as defined in claim 2, in which said baffles have horizontal flanges on the upper edges thereof, said horizontal flanges defining said surfaces for engaging the bases of said cutouts to support said blade in the first skimming position while the blade is moving the weir box area of the tank toward the outlet end.

4. Liquid clarification apparatus as defined in claim 1, in which said blade has V-shaped surfaces between adjacent cutouts with the apex of each V-shaped surface on the trailing side of said blade while the blade is in the first and second skimming positions.

5. Liquid clarification apparatus as defined in claim 1, in which said means maintaining said blade includes pivot means supporting said blade for pivotal movement between said second skimming position and said inoperative position, cable means on said bridge and connected to said blade for moving said blade between said second skimming position and said inoperative position, and cam means adjacent said weir boxes for maintaining said blade in the first skimming position while said blade is in the weir box area of the tank, said cam means accommodating movement of said blade to the second skimming position when said blade leaves the weir box area of the tank.

6. Liquid clarification apparatus as defined in claim 5, including baffles surrounding each of said weir boxes with said cam means located on the upper edges of said baffles, said cam means engaging the bases of said cutouts.

7. Liquid clarification apparatus as defined in claim 6, in which said cam means each include a horizontal portion maintaining said blade in the first skimming position and an inclined portion accommodating movement of the blade from the first to the second skimming position.

8. Liquid clarification apparatus comprising a tank having an inlet for supplying liquid having entrained solids and an outlet for receiving clarified liquid, said outlet including a plurality of transversely spaced longitudinally extending weir boxes in said tank for receiving said clarified liquid, said weir boxes each having a bottom wall and side walls with upper edges of said side walls defining the liquid level in said tank; scum baffles surrounding each weir box, said scum baffles having upper and lower edges respectively located above and below said upper edges; a traveling bridge supported on said tank; drive means for reciprocating said bridge between extreme positions parallel to said longitudinally extending weir boxes and said baffles; and skimming means supported on said bridge and extending transversely of said tank for removing scum from the surface of the liquid, said skimming means including an elongated blade having cutouts extending from the lower edge, said cutouts having bases located above said lower edge and being aligned with said baffles, and means maintaining said blade in a first skimming position wherein the bases of said cutouts are above said upper edges of said side walls while said bridge is traversing the weir box area of said tank in one direction and a second skimming position wherein the bases of said cutouts are below said upper edges of said side walls while the bridge is traveling in the area of the tank between the weir boxes and the inlet in said one direction.

9. Liquid clarification apparatus as defined in claim 8, in which said means maintaining said blade includes cam means in the weir box area of the tank supporting said blade in the first skimming position.

10. Liquid clarification apparatus as defined in claim 9, in which said means maintaining said blade includes pivot means supporting said blade in the second skimming position, said pivot means supporting said blade in an inoperative position while said bridge is moving in the opposite direction.

11. Skimming means for use in a tank having an inlet and an outlet with transversely spaced, longitudinally extending weir boxes between said outlet and said inlet comprising an elongated blade having opposite ends and opposite edges, one of said edges having spaced cutouts that are substantially rectangular, said cutouts having bases that extend substantially parallel to said one edge, said blade being V-shaped in plan view between each pair of adjacent cutouts so that said blade can skim the surface of a liquid in the tank by having said one edge located below the surface of the liquid in the area of the tank having the weir boxes while the bases of the cutouts are located above the weir boxes.

* * * * *